US012809484B2

(12) United States Patent

Jiang

(10) Patent No.: US 12,809,484 B2

(45) Date of Patent: Nov. 24, 2026

(54) CAPACITIVE TOUCH DISPLAY DEVICE AND WAKE-UP METHOD THEREOF

(71) Applicant: ILI TECHNOLOGY CORP., Hsinchu County (TW)

(72) Inventor: Chun-Yu Jiang, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/976,269

(22) Filed: Dec. 10, 2024

(65) Prior Publication Data

US 2026/0118995 A1 Apr. 30, 2026

(30) Foreign Application Priority Data

Oct. 25, 2024 (TW) ................................ 113140790

(51) Int. Cl.
*G06F 3/044* (2006.01)

(52) U.S. Cl.
CPC .. *G06F 3/0442* (2019.05); *G06F 2203/04104* (2013.01); *G06F 2203/04106* (2013.01); *G06F 2203/04114* (2019.05)

(58) Field of Classification Search
CPC ......... G06F 3/0442; G06F 2203/04104; G06F 2203/04106; G06F 2203/04114
See application file for complete search history.

(56) References Cited

U.S. PATENT DOCUMENTS 11,422,663 B1 * 8/2022 Tan ..................... G06F 3/03545
12,086,358 B1 * 9/2024 Ma .................... G06F 3/041662
2008/0162996 A1 * 7/2008 Krah ..................... G06F 3/0445 345/173
2014/0022203 A1 1/2014 Karpin et al.
2014/0071066 A1 3/2014 Lee et al.
2015/0234446 A1 * 8/2015 Nathan ................. G06F 3/0445 345/174

(Continued)

FOREIGN PATENT DOCUMENTS

CN 104978068 10/2015
CN 106415456 2/2017

(Continued)

OTHER PUBLICATIONS

"Office Action of Taiwan Counterpart Application", issued on Sep. 8, 2025, p. 1-p. 8.

*Primary Examiner* — Bryan Earles
(74) *Attorney, Agent, or Firm* — JCIPRNET

(57) ABSTRACT

A capacitive touch display device and a wake-up method thereof are provided. A touch display panel is controlled to adjust a touch sensing scanning frequency for sensing a first touch tool or a frequency of a downlink signal of a second touch tool to enable the touch display panel to sense touch operations of the first touch tool and the second touch tool within a preset frequency range including the touch sensing scanning frequency. During a touch sensing period, the touch display panel is controlled to simultaneously sense the touch operations of the first touch tool and the second touch tool. In response to a touch operation being sensed by the touch display panel during the touch sensing period, the capacitive touch display device is woken up and enters a normal mode.

12 Claims, 5 Drawing Sheets

(56) References Cited

U.S. PATENT DOCUMENTS

| | | | | |
|---|---|---|---|---|
| 2016/0048234 | A1* | 2/2016 | Chandran | G06F 3/0442 345/174 |
| 2016/0092010 | A1 | 3/2016 | Agarwal et al. | |
| 2016/0162102 | A1* | 6/2016 | Shahparnia | G06F 1/3215 345/174 |
| 2019/0171320 | A1 | 6/2019 | Kim et al. | |
| 2020/0004367 | A1 | 1/2020 | Lee et al. | |
| 2020/0097118 | A1 | 3/2020 | Kang et al. | |
| 2021/0056286 | A1* | 2/2021 | Cheng | G06F 1/3206 |
| 2022/0253191 | A1 | 8/2022 | Liu | |
| 2022/0308696 | A1* | 9/2022 | Lee | G06F 3/04162 |
| 2022/0365654 | A1* | 11/2022 | Lee | G06F 3/044 |
| 2023/0039061 | A1* | 2/2023 | Dongbang | G06F 3/04164 |
| 2024/0160317 | A1* | 5/2024 | Jang | G06F 3/0412 |
| 2024/0272756 | A1 | 8/2024 | Nomura | |
| 2025/0053254 | A1* | 2/2025 | Jiang | G06F 3/0416 |

FOREIGN PATENT DOCUMENTS

| | | | |
|---|---|---|---|
| CN | 109844697 | 6/2019 | |
| CN | 110032287 | 7/2019 | |
| CN | 112346588 | 2/2021 | |
| CN | 117331445 | 1/2024 | |
| TW | 201512944 | 4/2015 | |
| TW | 202107258 | 2/2021 | |
| WO | WO-2015036999 A1 * | 3/2015 | G06F 3/0446 |

* cited by examiner

CAPACITIVE TOUCH DISPLAY DEVICE AND WAKE-UP METHOD THEREOF

CROSS-REFERENCE TO RELATED APPLICATION

This application claims the priority benefit of Taiwan application serial no. 113140790, filed on Oct. 25, 2024. The entirety of the above-mentioned patent application is hereby incorporated by reference herein and made a part of this specification.

BACKGROUND

Technical Field

The disclosure relates to a touch device, and particularly relates to a capacitive touch display device and a wake-up method thereof.

Description of Related Art

Touch screen technology has been widely used in various types of consumer electronic devices, allowing the users to intuitively select items on the screen to use different functions. Electronic devices equipped with touch devices are usually configured to enter a power-saving mode for the purpose of reducing power consumption. However, in the power-saving mode, the electronic devices still need to determine whether to wake up from the power-saving mode through a detection mechanism.

SUMMARY

The disclosure provides a capacitive touch display device and a wake-up method thereof, which further reduce power consumption.

The capacitive touch display device according to an embodiment of the disclosure includes a touch display panel and a control circuit. The control circuit is configured to control the touch display panel to adjust a touch sensing scanning frequency for sensing a first touch tool or a frequency of a downlink signal of a second touch tool in a power-saving mode to enable the touch display panel to sense touch operations of the first touch tool and the second touch tool within a preset frequency range that includes the touch sensing scanning frequency, control the touch display panel to simultaneously sense the touch operations of the first touch tool and the second touch tool during a touch sensing period, and wake up the capacitive touch display device to enter a normal mode in response to the touch display panel sensing a touch operation during the touch sensing period.

In an embodiment of the disclosure, the touch sensing scanning frequency is an odd number multiple of the frequency of the downlink signal.

In an embodiment of the disclosure, the preset frequency range is defined by an upper cut-off frequency and a lower cut-off frequency, and the upper cut-off frequency and the lower cut-off frequency are determined based on a noise level of the capacitive touch display device or a filter bandwidth of the capacitive touch display device.

In an embodiment of the disclosure, the control circuit is configured to control the touch display panel to send out an uplink signal to adjust the frequency of the downlink signal of the second touch tool during an uplink signal transmission period.

In an embodiment of the disclosure, the first touch tool is a finger, and the second touch tool is an active stylus.

In an embodiment of the disclosure, the first touch tool and the second touch tool are active styluses.

In an embodiment of the disclosure, each frame period of the touch display panel includes one touch sensing period.

In an embodiment of the disclosure, the control circuit is configured not to perform a reporting operation for a touch position during the touch sensing period.

The disclosure further provides a wake-up method of a capacitive touch display device, including the following. A touch display panel is controlled to adjust a touch sensing scanning frequency for sensing a first touch tool or a frequency of a downlink signal of a second touch tool in a power-saving mode to enable the touch display panel to sense touch operations of the first touch tool and the second touch tool within a preset frequency range that includes the touch sensing scanning frequency. The touch display panel is controlled to simultaneously sense the touch operations of the first touch tool and the second touch tool during a touch sensing period. The capacitive touch display device is woken up to enter a normal mode in response to the touch display panel sensing a touch operation during the touch sensing period.

In an embodiment of the disclosure, the touch sensing scanning frequency is an odd number multiple of the frequency of the downlink signal.

In an embodiment of the disclosure, the preset frequency range is defined by an upper cut-off frequency and a lower cut-off frequency, and the upper cut-off frequency and the lower cut-off frequency are determined based on a noise level of the capacitive touch display device or a filter bandwidth of the capacitive touch display device.

In an embodiment of the disclosure, the wake-up method of the capacitive touch display device further includes controlling the touch display panel to send out an uplink signal to adjust the frequency of the downlink signal of the second touch tool during an uplink signal transmission period.

In an embodiment of the disclosure, the first touch tool is a finger, and the second touch tool is an active stylus.

In an embodiment of the disclosure, the first touch tool and the second touch tool are active styluses.

In an embodiment of the disclosure, each frame period of the touch display panel includes one touch sensing period.

In an embodiment of the disclosure, a reporting operation for a touch position is not performed during the touch sensing period.

Based on the above, according to the embodiments of the disclosure, the touch display panel is controlled to adjust the scanning frequency of the touch sensing operation for sensing the first touch tool or the frequency of the downlink signal of the second touch tool to enable the touch display panel to sense the touch operations of the first touch tool and the second touch tool within the preset frequency range that includes the touch sensing scanning frequency. During the touch sensing period, the touch display panel is controlled to simultaneously sense the first touch tool and the second touch tool, and wake up the capacitive touch display device to enter the normal mode in response to the touch display panel sensing a touch operation during the touch sensing period. The disclosure eliminates the need to sense the touch operations of the first touch tool and the second touch tool in different sensing periods, thereby increasing the idle time of the capacitive touch display device when in the power-saving mode, and reducing the power consumption of the capacitive touch display device in the power-saving mode.

DESCRIPTION OF THE EMBODIMENTS

Figure 1:
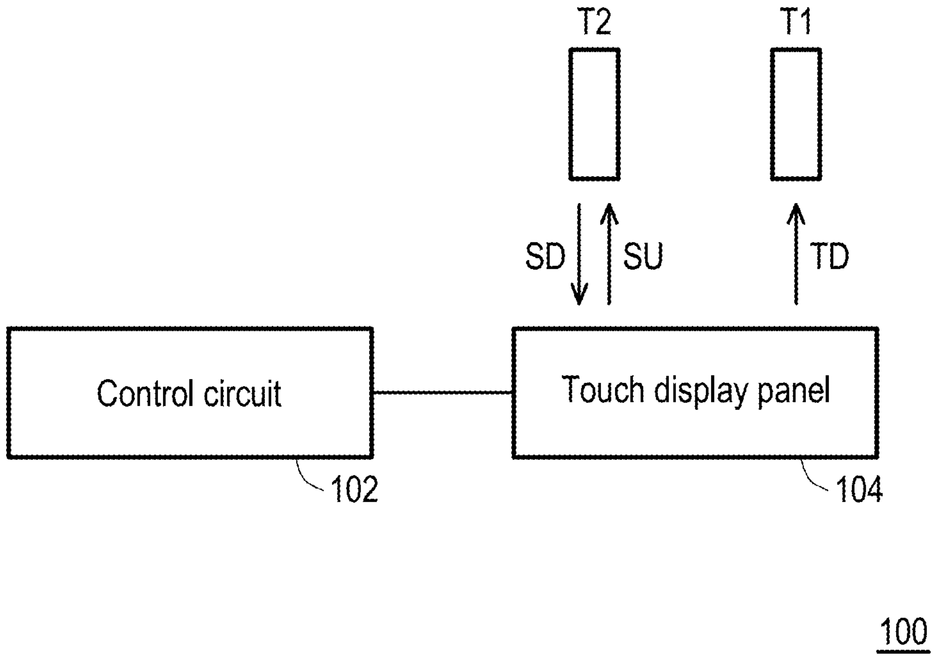
FIG. 1 is a schematic diagram showing the capacitive touch display device according to an embodiment of the disclosure.

To facilitate understanding of the disclosure, embodiments will be described hereinafter as specific examples of implementation of the disclosure. Additionally, where possible, components/elements/steps with the same reference numerals in the figures and embodiments represent the same or similar parts.

Hereinafter, referring to FIG. 1, FIG. 1 is a schematic diagram showing the capacitive touch display device according to an embodiment of the disclosure. A capacitive touch display device 100 includes a control circuit 102 and a touch display panel 104, with the control circuit 102 coupled to the touch display panel 104.

Figure 2:
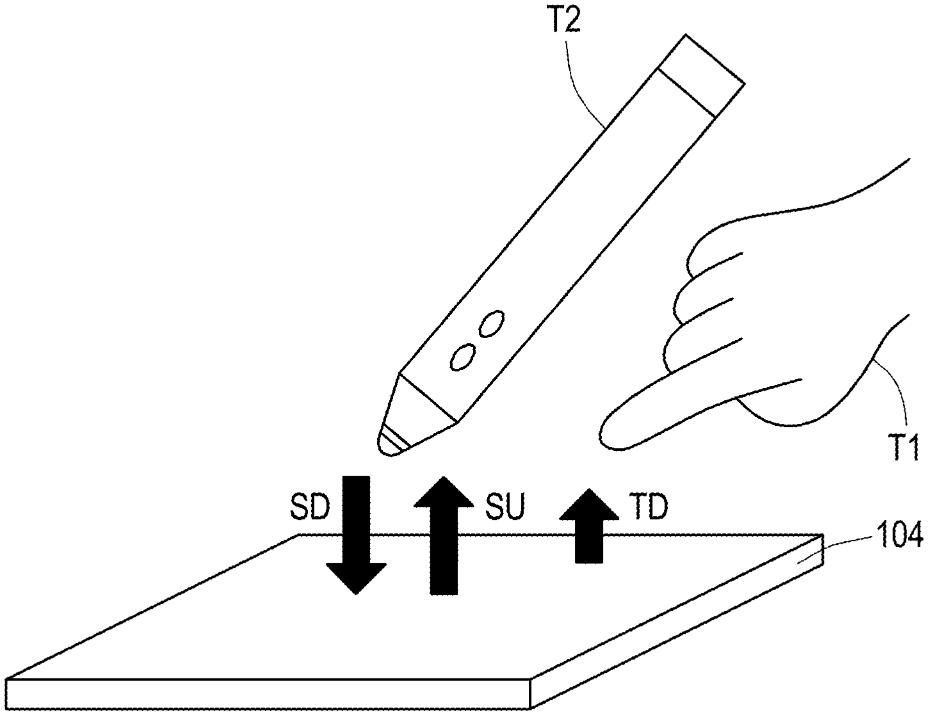
FIG. 2 is a schematic diagram showing the capacitive touch display device according to another embodiment of the disclosure.

When the capacitive touch display device 100 is in a power-saving mode, the control circuit 102 may control the touch display panel 104 to adjust the scanning frequency of a touch sensing TD for sensing a first touch tool T1 or the frequency of a downlink signal SD sent out by a second touch tool T2 to enable the touch display panel 104 to sense touch operations of the first touch tool T1 and the second touch tool T2 within a preset frequency range. The control circuit 102 may control the touch display panel 104 to simultaneously sense the first touch tool T1 and the second touch tool T2 during a touch sensing period, and wake up the capacitive touch display device 100 to enter a normal mode in response to the touch display panel 104 sensing a touch operation during the touch sensing period. It is worth noting that, during the touch sensing period, the control circuit 102 does not perform a reporting operation for a touch position, thereby reducing the power consumption of the capacitive touch display device 100. Specifically, as shown in FIG. 2, the first touch tool T1 and the second touch tool T2 may be a finger and an active stylus, respectively, but are not limited thereto. For example, in other embodiments, the first touch tool T1 may be an active stylus.

Figure 3:
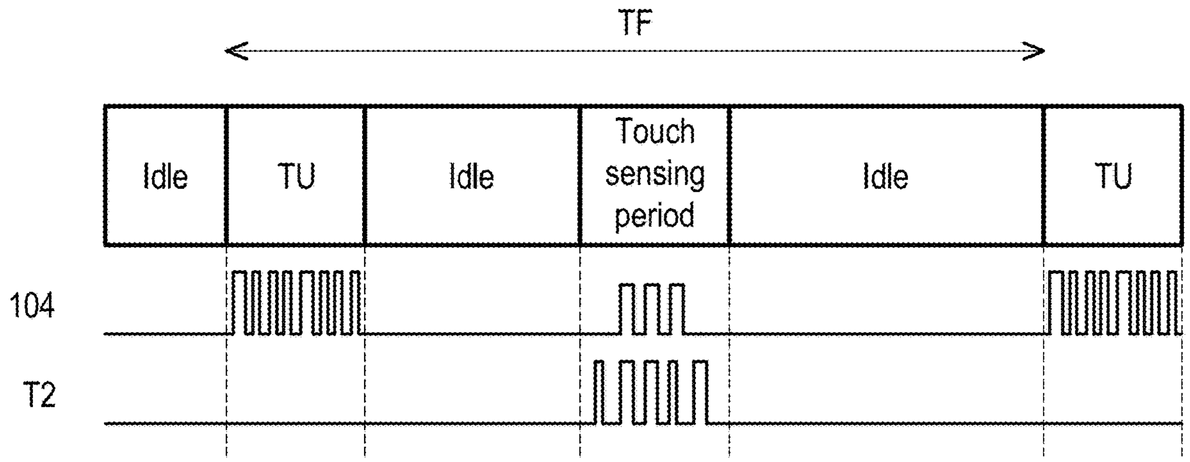
FIG. 3 is an operation timing diagram of the capacitive touch display device according to an embodiment of the disclosure.

To be more specific, as shown in FIG. 1 to FIG. 3, when the capacitive touch display device 100 is in the power-saving mode, the control circuit 102 may control the touch display panel 104 to send out an uplink signal SU to the second touch tool T2 during an uplink signal transmission period TU within a frame period TF, so as to adjust the frequency of the downlink signal SD sent out by the second touch tool T2. Thereby, the touch display panel 104 can sense the touch operations of the first touch tool T1 and the second touch tool T2 within the preset frequency range during the touch sensing period. For example, during the touch sensing period, the touch display panel 104 may sense the change in capacitance caused by the first touch tool T1 touching the touch display panel 104, or sense the downlink signal SD sent out by the second touch tool T2. Within one frame period TF, there is one touch sensing period for sensing the touch operations of the first touch tool T1 and the second touch tool T2. In addition, when in the power-saving mode, the control circuit 102 may also adjust the scanning frequency of the touch sensing TD to enable the touch display panel 104 to sense the touch operations of the first touch tool T1 and the second touch tool T2 within the preset frequency range during the touch sensing period.

Figure 4:
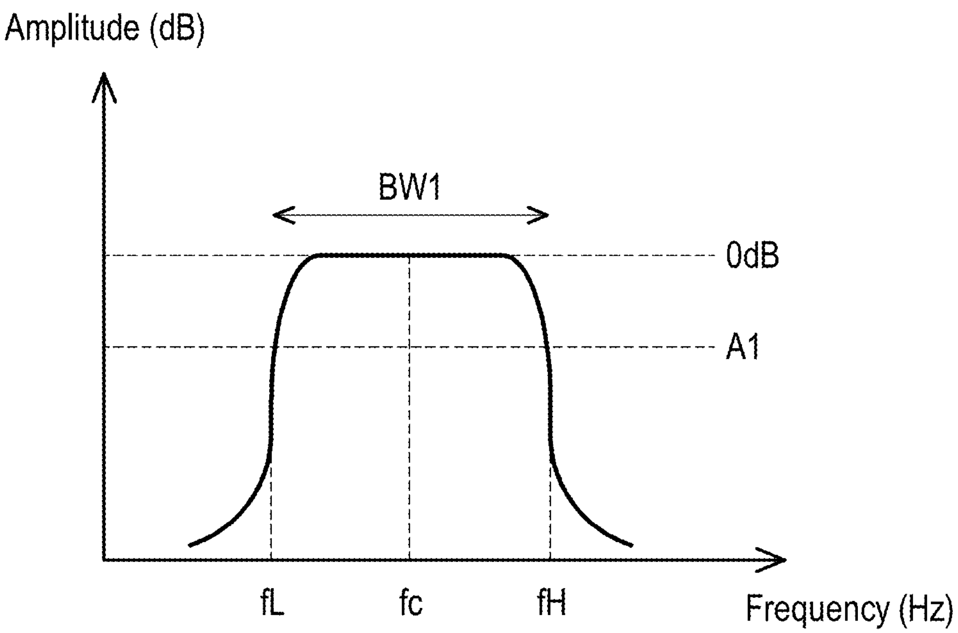
FIG. 4 is a schematic diagram showing the preset frequency range according to an embodiment of the disclosure.

As shown in FIG. 4, the preset frequency range BW1 includes the scanning frequency fc of the touch sensing TD adjusted for sensing the first touch tool T1. The preset frequency range BW1 is defined by an upper cut-off frequency fH and a lower cut-off frequency fL. The preset frequency range BW1 may be, for example, the filter bandwidth of the capacitive touch display device, and the amplitude value A1 may be, for example, −3 dB, but is not limited thereto. In other embodiments, the upper cut-off frequency fH and the lower cut-off frequency fL may be determined based on, for example, the noise level of the capacitive touch display device 100. In the case where noise does not affect the sensing signal generated by the touch display panel 104 sensing the touch operations within the preset frequency range BW1, the frequency values of the upper cut-off frequency fH and the lower cut-off frequency fL may be adjusted, for example, by increasing the frequency value of the upper cut-off frequency fH and decreasing the frequency value of the lower cut-off frequency fL, but the disclosure is not limited thereto. Specifically, the preset frequency range BW1 covers an odd number multiple of the scanning frequency fc of the touch sensing TD. For example, the frequency of the downlink signal SD sent out by the second touch tool T2 may be adjusted to an odd number multiple of the scanning frequency fc of the touch sensing TD. The odd number multiple of the scanning frequency fc of the touch sensing TD mentioned here may be, for example, 1, 3, or 5 times the frequency, or may refer to an approximate odd number multiple (for example, approximately 1, 3, or 5 times) of the frequency. For instance, in the case where the scanning frequency fc of the touch sensing TD is 100 kHz, the frequency of the downlink signal SD sent out by the second touch tool T2 may be adjusted to 100 kHz, 300 kHz, or 500 kHz to enable the touch display panel 104 to sense the touch operations of the first touch tool T1 and the second touch tool T2 within the preset frequency range BW1.

Since the touch display panel 104 is able to sense the touch operations of the first touch tool T1 and the second touch tool T2 within the preset frequency range BW1, the control circuit 102 may control the touch display panel 104 to simultaneously sense the touch operations of the first touch tool T1 and the second touch tool T2 within one touch sensing period, without the need to sense the touch operations of the first touch tool T1 and the second touch tool T2 in different sensing periods. This increases the idle time of the capacitive touch display device 100 in the power-saving mode, and further reduces the power consumption of the capacitive touch display device 100 in the power-saving mode.

When the touch display panel 104 senses a touch operation (that is, when a sensing amount appears) within the preset frequency range BW1, the control circuit 102 may wake up the capacitive touch display device 100 to enter the normal mode to sense the touch position. Specifically, in the normal mode, one frame period TF may include two touch sensing periods, wherein one touch sensing period is used to sense the touch operation of the first touch tool T1, and the other touch sensing period is used to sense the touch operation of the second touch tool T2. In the normal mode, the control circuit 102 may determine whether the sensed touch operation is the touch operation of the first touch tool T1 or the second touch tool T2. For example, whether the sensed touch operation is from the first touch tool T1 or the second touch tool T2, or merely a false operation caused by noise may be determined based on the sensibility of a specific touch position. If the touch operation is from the first touch tool T1 or the second touch tool T2, the touch position may then be determined. If the touch operation is not from the first touch tool T1 or the second touch tool T2, but is a false operation caused by a noise signal, for example, the control circuit 102 may control the capacitive touch display device 100 to enter the power-saving mode again.

Figure 5:
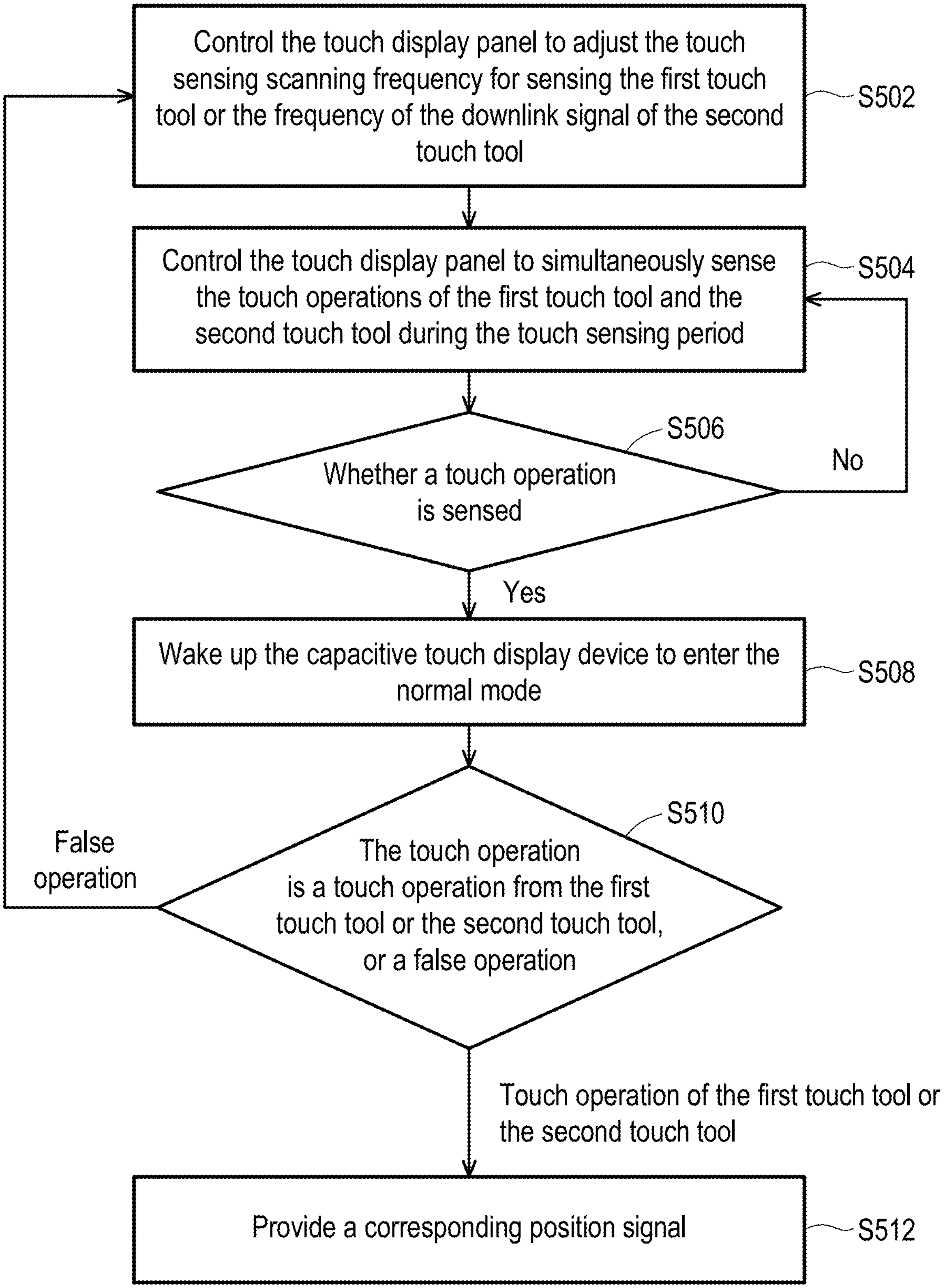
FIG. 5 is a flowchart showing a wake-up method of the capacitive touch display device according to an embodiment of the disclosure.

FIG. 5 is a flowchart showing a wake-up method of a capacitive touch display device according to an embodiment of the disclosure. As can be seen from the above implementation, the wake-up method for waking up the capacitive touch display device from the power-saving mode may include the following. First, the touch display panel is controlled to adjust the scanning frequency of the touch sensing operation for sensing the first touch tool or the frequency of the downlink signal of the second touch tool to enable the touch display panel to sense the touch operations of the first touch tool and the second touch tool within the preset frequency range that includes the touch sensing scanning frequency (step S502). The first touch tool may be a finger, and the second touch tool may be an active stylus, for example. The preset frequency range is defined by the upper cut-off frequency and the lower cut-off frequency, and the upper cut-off frequency and the lower cut-off frequency may be determined based on, for example, the noise level of the capacitive touch display device or the filter bandwidth of the capacitive touch display device. The touch sensing scanning frequency may be an odd number multiple of the frequency of the downlink signal. In addition, a method of adjusting the frequency of the downlink signal of the second touch tool may include, for example, controlling the touch display panel to send out an uplink signal during the uplink signal transmission period within the frame period to adjust the frequency of the downlink signal of the second touch tool.

Next, during the touch sensing period, the touch display panel is controlled to simultaneously sense the touch operations of the first touch tool and the second touch tool (step S504), and determine whether the touch display panel senses a touch operation during the touch sensing period (step S506), that is, whether a sensing amount appears within the preset frequency range BW1, wherein each frame period of the touch display panel includes one touch sensing period. If no touch operation is sensed, the process may return to step S504 to perform touch operation sensing. If a touch operation is sensed, the capacitive touch display device may be woken up to enter the normal mode and perform touch position sensing (step S508). Then, whether the sensed touch operation is from the first touch tool or the second touch tool, or a false operation caused by a noise signal is determined based on the sensing result of the touch position (step S510). If the sensed touch operation is a false operation caused by a noise signal, the capacitive touch display device may enter the power-saving mode again and return to step S502. If the sensed touch operation is a touch operation from the first touch tool or the second touch tool, a corresponding position signal may be provided based on the sensing result of the touch position (step S512).

In summary, according to the embodiments of the disclosure, the touch display panel is controlled to adjust the scanning frequency of the touch sensing for sensing the first touch tool or the frequency of the downlink signal of the second touch tool to enable the touch display panel to sense the touch operations of the first touch tool and the second touch tool within the preset frequency range that includes the touch sensing scanning frequency. During the touch sensing period, the touch display panel is controlled to simultaneously sense the first touch tool and the second touch tool, and wake up the capacitive touch display device to enter the normal mode in response to the touch display panel sensing a touch operation during the touch sensing period. The disclosure eliminates the need to sense the touch operations of the first touch tool and the second touch tool in different sensing periods, thereby increasing the idle time of the capacitive touch display device when in the power-saving mode, and reducing the power consumption of the capacitive touch display device in the power-saving mode.

What is claimed is:

1. A capacitive touch display device, comprising:

a touch display panel; and a control circuit configured to control the touch display panel to adjust a touch sensing scanning frequency for sensing a first touch tool or a frequency of a downlink signal of a second touch tool in a power-saving mode to enable the touch display panel to sense touch operations of the first touch tool and the second touch tool within a preset frequency range that comprises the touch sensing scanning frequency, control the touch display panel to simultaneously sense the touch operations of the first touch tool and the second touch tool during a touch sensing period, and wake up the capacitive touch display device to enter a normal mode in response to the touch display panel sensing a touch operation during the touch sensing period;

wherein, in the power-saving mode, the control circuit is configured not to perform a reporting operation for a touch position during the touch sensing period; and wherein, during the touch sensing period in the power-saving mode, the touch sensing scanning frequency is substantially equal to the frequency of the downlink signal.

2. The capacitive touch display device according to claim 1, wherein the preset frequency range is defined by an upper cut-off frequency and a lower cut-off frequency, and the upper cut-off frequency and the lower cut-off frequency are determined based on a noise level of the capacitive touch display device or a filter bandwidth of the capacitive touch display device.

3. The capacitive touch display device according to claim 1, wherein the control circuit is configured to control the touch display panel to send out an uplink signal to adjust the frequency of the downlink signal of the second touch tool during an uplink signal transmission period.

4. The capacitive touch display device according to claim 1, wherein the first touch tool is a finger, and the second touch tool is an active stylus.

5. The capacitive touch display device according to claim 1, wherein the first touch tool and the second touch tool are active styluses.

6. The capacitive touch display device according to claim 1, wherein each frame period of the touch display panel comprises one touch sensing period.

7. A wake-up method of a capacitive touch display device, the wake-up method comprising:

controlling a touch display panel to adjust a touch sensing scanning frequency for sensing a first touch tool or a frequency of a downlink signal of a second touch tool in a power-saving mode to enable the touch display panel to sense touch operations of the first touch tool and the second touch tool within a preset frequency range that comprises the touch sensing scanning frequency;

controlling the touch display panel to simultaneously sense the touch operations of the first touch tool and the second touch tool during a touch sensing period; and waking up the capacitive touch display device to enter a normal mode in response to the touch display panel sensing a touch operation during the touch sensing period;

wherein, in the power-saving mode, a reporting operation for a touch position is not performed during the touch sensing period; and wherein, during the touch sensing period in the power-saving mode, the touch sensing scanning frequency is substantially equal to the frequency of the downlink signal.

8. The wake-up method of the capacitive touch display device according to claim 7, wherein the preset frequency range is defined by an upper cut-off frequency and a lower cut-off frequency, and the upper cut-off frequency and the lower cut-off frequency are determined based on a noise level of the capacitive touch display device or a filter bandwidth of the capacitive touch display device.

9. The wake-up method of the capacitive touch display device according to claim 7, further comprising:

controlling the touch display panel to send out an uplink signal to adjust the frequency of the downlink signal of the second touch tool during an uplink signal transmission period.

10. The wake-up method of the capacitive touch display device according to claim 7, wherein the first touch tool is a finger, and the second touch tool is an active stylus.

11. The wake-up method of the capacitive touch display device according to claim 7, wherein the first touch tool and the second touch tool are active styluses.

12. The wake-up method of the capacitive touch display device according to claim 7, wherein each frame period of the touch display panel comprises one touch sensing period.

* * * * *